(12) United States Patent
Krishnamurthy

(10) Patent No.: US 9,200,907 B2
(45) Date of Patent: Dec. 1, 2015

(54) METHOD OF DETERMINING FREQUENCY OF VEHICLE WASHES

(71) Applicant: Nissan North America, Inc., Franklin, TN (US)

(72) Inventor: Vikram Krishnamurthy, Smyrna, GA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 55 days.

(21) Appl. No.: 14/165,753

(22) Filed: Jan. 28, 2014

(65) Prior Publication Data

US 2015/0211865 A1    Jul. 30, 2015

(51) Int. Cl.
*G08G 1/123*    (2006.01)
*G01C 21/26*    (2006.01)

(52) U.S. Cl.
CPC ..................................... *G01C 21/26* (2013.01)

(58) Field of Classification Search
CPC .................................. B60R 11/00; G05D 1/00
USPC .......................... 701/400, 2, 49, 408; 340/989
See application file for complete search history.

(56) References Cited

U.S. PATENT DOCUMENTS

2013/0079998 A1*    3/2013    Furness et al. ................... 701/49
2013/0304379 A1*    11/2013   Fulger et al. ................... 701/533

* cited by examiner

*Primary Examiner* — Luke Huynh
(74) *Attorney, Agent, or Firm* — Young Basile Hanlon & MacFarlane, P.C.

(57) ABSTRACT

A method for determining whether a vehicle was washed at a carwash includes recording navigation data for a vehicle. The method further includes identifying whether the vehicle was located at a carwash based on the recorded navigation data, identifying at least one indication that the vehicle was washed while located at the carwash, and determining that the vehicle was washed at the carwash if the vehicle was located at the carwash and at least one indication is identified that the vehicle was washed while located at the carwash.

17 Claims, 4 Drawing Sheets

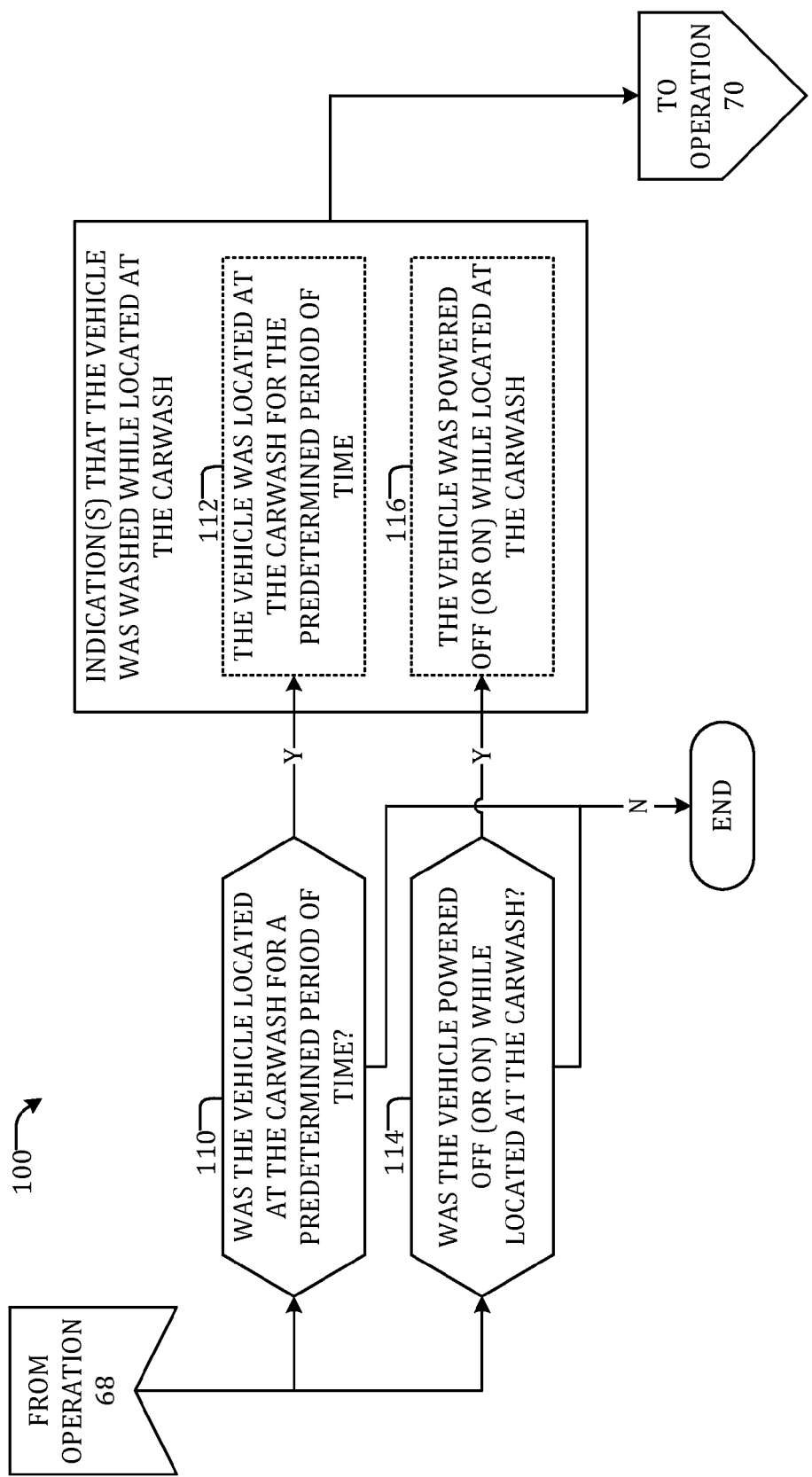

METHOD OF DETERMINING FREQUENCY OF VEHICLE WASHES

TECHNICAL FIELD

The embodiments disclosed herein generally relate to the evaluation of recorded vehicle data.

BACKGROUND

Vehicle manufacturers and vehicle dealers may desire information concerning how well their vehicles are maintained in the field. For example, vehicle manufacturers and vehicle dealers may be interested in knowing whether, and to what extent, drivers take their vehicles in for carwashes or other types of discretionary maintenance. This information may give a vehicle manufacturer insight into the resale value of its vehicles. Similarly, this information may be used by a vehicle dealer to estimate the residual value of a leased vehicle.

SUMMARY

Disclosed herein are embodiments of systems in which recorded vehicle data is evaluated to determine whether a vehicle has been washed at a carwash. In one aspect, a method for determining whether a vehicle was washed at a carwash comprises recording navigation data for a vehicle, identifying whether the vehicle was located at a carwash based on the recorded navigation data, identifying at least one indication that the vehicle was washed while located at the carwash, and determining that the vehicle was washed at the carwash if the vehicle was located at the carwash and at least one indication is identified that the vehicle was washed while located at the carwash.

In another aspect, an apparatus for determining whether a vehicle was washed at a carwash comprises at least one processor. The at least one processor is configured to execute instructions stored in a memory to record navigation data for a vehicle, identify whether the vehicle was located at a carwash based on the recorded navigation data, identify at least one indication that the vehicle was washed while located at the carwash, and determine that the vehicle was washed at the carwash if the vehicle was located at the carwash and at least one indication is identified that the vehicle was washed while located at the carwash.

In yet another aspect, a method for determining whether a vehicle was washed at a carwash comprises recording vehicle data, wherein the vehicle data includes navigation data for a vehicle and vehicle condition data for the vehicle, identifying at least some of the vehicle data as corresponding to at least one of nighttime conditions or a period where there was precipitation in an area near or including the location of the vehicle, matching, with the identified at least some of the vehicle data removed from consideration, at least some of the vehicle data to the location of a carwash, using the vehicle data matched to the location of the carwash, identifying at least one indication that the vehicle was washed while located at the carwash, the at least one indication including that the vehicle was located at the carwash for at least a predetermined period of time, and upon identifying the at least one indication, determining that the vehicle was washed at the carwash.

These and other aspects will be described in additional detail below.

BRIEF DESCRIPTION OF THE DRAWINGS

The various features, advantages and other uses of the present apparatus and methods will become more apparent by referring to the following detailed description and drawings in which:

FIGS. 4 and 5 are flow diagrams depicting operations for supporting the identification of instances where the vehicle has been taken to a carwash and washed.

DETAILED DESCRIPTION

Figures 1, 2:
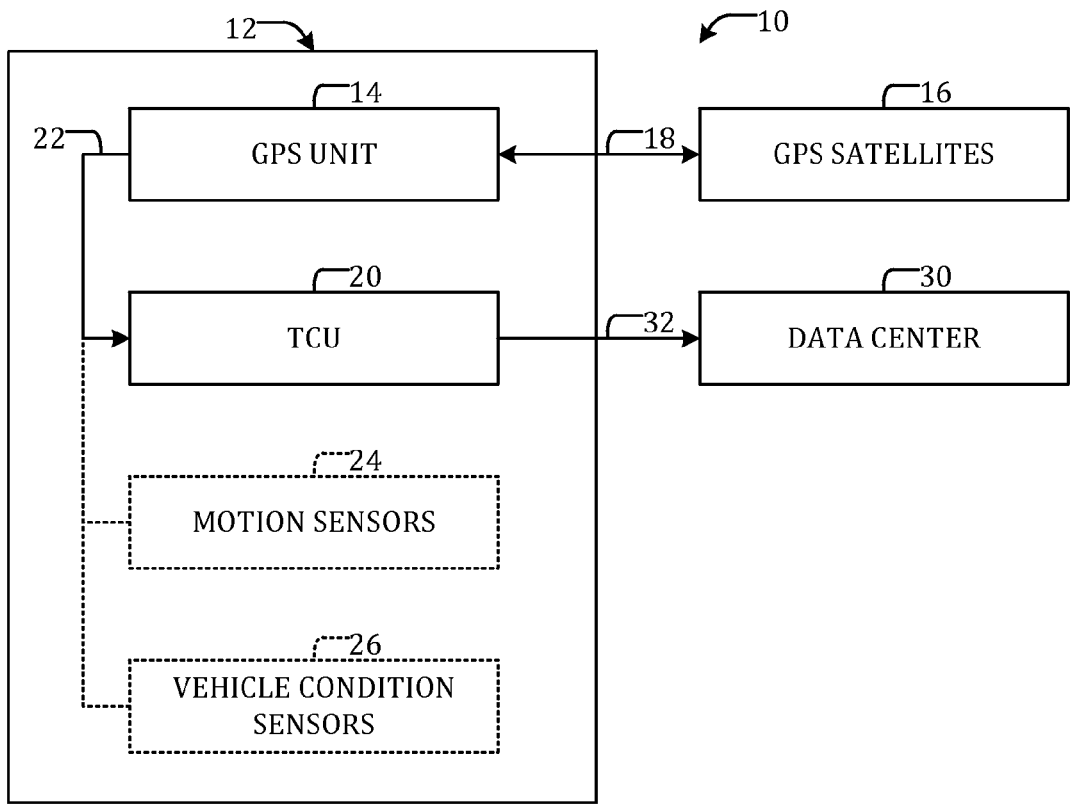
FIG. 1 is a schematic block diagram of an example of a system for generating vehicle data and recording the vehicle data for evaluation, showing a data center and a vehicle with a telematics control unit (TCU) for communicating vehicle data to the data center.
FIG. 2 represents an example of a data structure for recording the vehicle data.

FIG. 1 is a schematic representation of an example of a system 10 for use in collecting and recording vehicle data 40 from a vehicle 12 for remote evaluation. As explained below with reference to FIG. 2, in the system 10, the vehicle data 40 will include but is not limited to navigation data for the vehicle 12.

In the example system 10, the vehicle 12 is generally configured to support the generation of navigation data for the vehicle 12. As shown, the vehicle 12 is equipped with a global positioning system (GPS) unit 14. The GPS unit 14 is communicatively coupled to a plurality of GPS satellites 16 over a communications channel 18. The communication channel 18 may be a wireless channel, for example, using a standard or proprietary protocol. The GPS satellites 16 may generally be configured to communicate signals to the GPS unit 14 that permit the position of the GPS unit 14, and by extension the vehicle 12, to be determined. In a non-limiting example, the position of the vehicle 12 may be associated with a coordinate system, such as a geographic coordinate system, for instance, that specifies position with reference to a latitude and longitude.

The GPS unit 14 is further communicatively coupled to a telematics control unit (TCU) 20 for the vehicle 12 over a communications channel 22. The communication channel 22 may be a wired or wireless channel configured to allow for sharing of information, data and/or computing resources between the GPS unit 14 and the TCU 20. The GPS unit 14, the TCU 20 and optionally, other devices, may be configured with respective hardware and software so that collectively signals may be received from the GPS satellites 16, multiple positions of the vehicle 12 over a period of time may be determined, and corresponding GPS navigation data for the vehicle 12 (i.e., navigation data originating from communication between the GPS unit 14 and the GPS satellites 16) may be stored in memory.

The GPS unit 14 and the TCU 20 may each be one or multiple computers including a random access memory (RAM), a read-only memory (ROM) and a central processing unit (CPU) in addition to various input and output connections. Generally, the control functions of the vehicle 12 described herein can be implemented by one or more software programs stored in internal or external memory and are performed by execution by the respective CPUs of the GPS unit 14 and the TCU 20. However, some or all of the functions could also be implemented by hardware components.

Although the GPS unit 14 and the TCU 20 are shown as separate units and described as performing respective operations, it will be understood that the operational aspects of the GPS unit 14 and the TCU 20 may be distributed differently than as specifically described. In one alternative, for example, the operational aspects of the GPS unit 14 and the TCU 20 could be embodied in a single unit.

The generation of standalone GPS navigation data for the vehicle 12 generally relies on communication between the GPS unit 14 and the GPS satellites 16 over the communications channel 18. The GPS navigation data for the vehicle 12 originating from communication between the GPS unit 14 and the GPS satellites 16 may be augmented with other navigation data. For example, as shown in FIG. 1, the vehicle 12 may optionally be equipped with one or more motion sensors 24 for supporting the generation of supplemental navigation data for the vehicle 12. The motion sensors 24 could be or include, for instance, an accelerometer or a gyroscope. According to this example, the TCU 20 could be configured to implement a so-called dead reckoning algorithm using GPS navigation data and input from the motion sensors 24 to generate supplemental navigation data for the vehicle 12. In other non-limiting examples of the vehicle 12, the TCU 20 could be configured, for instance, to implement a map-matching technique and/or assisted GPS to generate supplemental navigation data for the vehicle 12 using GPS navigation data.

The vehicle 12 may be configured to support the generation of other types of data for the vehicle 12 in addition to navigation data. For example, as shown, the vehicle 12 may optionally be equipped with vehicle condition sensors 26 for sensing or otherwise indicating any variety of conditions of the vehicle 12. The corresponding vehicle condition data can concern a variety of operational aspects of the vehicle 12, such as whether the vehicle 12 is powered on or off, for instance. The vehicle condition data sensed or otherwise indicated by the vehicle condition sensors 26 can be communicated to the TCU 20 as generally shown.

In the example system 10, the navigation data and any available vehicle condition data for the vehicle 12 may be correlated to a time element and transmitted by the TCU 20 to a remote data center 30 over a wireless communications channel 32 for evaluation, for example, by a vehicle manufacturer or dealer.

As represented in FIG. 2, the transmitted data can be stored at the data center 30 as vehicle data 40. In general, the vehicle data 40 is indicative, among other things, of the position of the vehicle 12 over a period of time. The vehicle data 40 may include raw values of navigation data that correspond to the position of the vehicle 12, which in an exemplary geographic coordinate system is specified in terms of latitude and longitude. The navigation data in the vehicle data 40 may include standalone GPS navigation data for the vehicle 12 originating from communication between the GPS unit 14 and the GPS satellites 16, and optionally, any generated supplemental navigation data for the vehicle 12. The vehicle data 40 additionally includes a time at which the vehicle 12 was located at each position. As explained above, the vehicle data 40 may further include vehicle condition data concerning the operation of the vehicle 12.

According to the illustrated and non-limiting example of the system 10, the GPS unit 14, the TCU 20, the optional motion sensors 24 and any other equipment for supporting the generation of navigation data for the vehicle 12 may be embedded in the vehicle 12. Similarly, the TCU 20 and any other equipment for supporting the transmission of the navigation data for the vehicle 12, and the vehicle condition data for the vehicle 12, if any, for remote recordation as vehicle data 40 at the data center 30 may also be embedded in the vehicle 12. In alternative examples of the system 10, other equipment may be implemented to generate navigation data for the vehicle 12 and/or transmit the navigation data and the vehicle condition data for the vehicle 12, either in place of or in addition to some or all of the equipment illustrated and described above as being embedded in the vehicle 12. For instance, in a non-limiting alternative example of the system 10, a mobile device such as a cell phone may be implemented to generate some or all of the navigation data for the vehicle 12, and/or to transmit some or all of the navigation data and the vehicle condition data for the vehicle 12. In another non-limiting alternative example of the system 10, the generated navigation data and the vehicle condition data for the vehicle 12 can be communicated to the data center 30 in part with a portable storage medium such as an SD card or a USB drive.

Exemplary operations for the system 10 are explained with reference to FIG. 3. According to one non-limiting example of the system 10, the evaluation of the vehicle data 40 is performed at the data center 30 under the control, for example, of a vehicle manufacturer or dealer. The data center 30 may be one or multiple computers including a random access memory (RAM), a read-only memory (ROM) and a central processing unit (CPU) in addition to various input and output connections. Generally, the control functions of the data center 30 described herein can be implemented by one or more software programs stored in internal or external memory and are performed by execution by the CPU of the data center 30. However, some or all of the functions could also be implemented by hardware components. Although the evaluation of the vehicle data 40 is described with reference to the data center 30, in alternative examples of the system 10, some or all of the evaluation of the vehicle data 40 may be performed or otherwise supported using equipment embedded in the vehicle 12, such as the TCU 20, or using other equipment, such as a mobile device, with the results being transmitted to the data center 30 for recordation and/or further evaluation.

Figure 3:
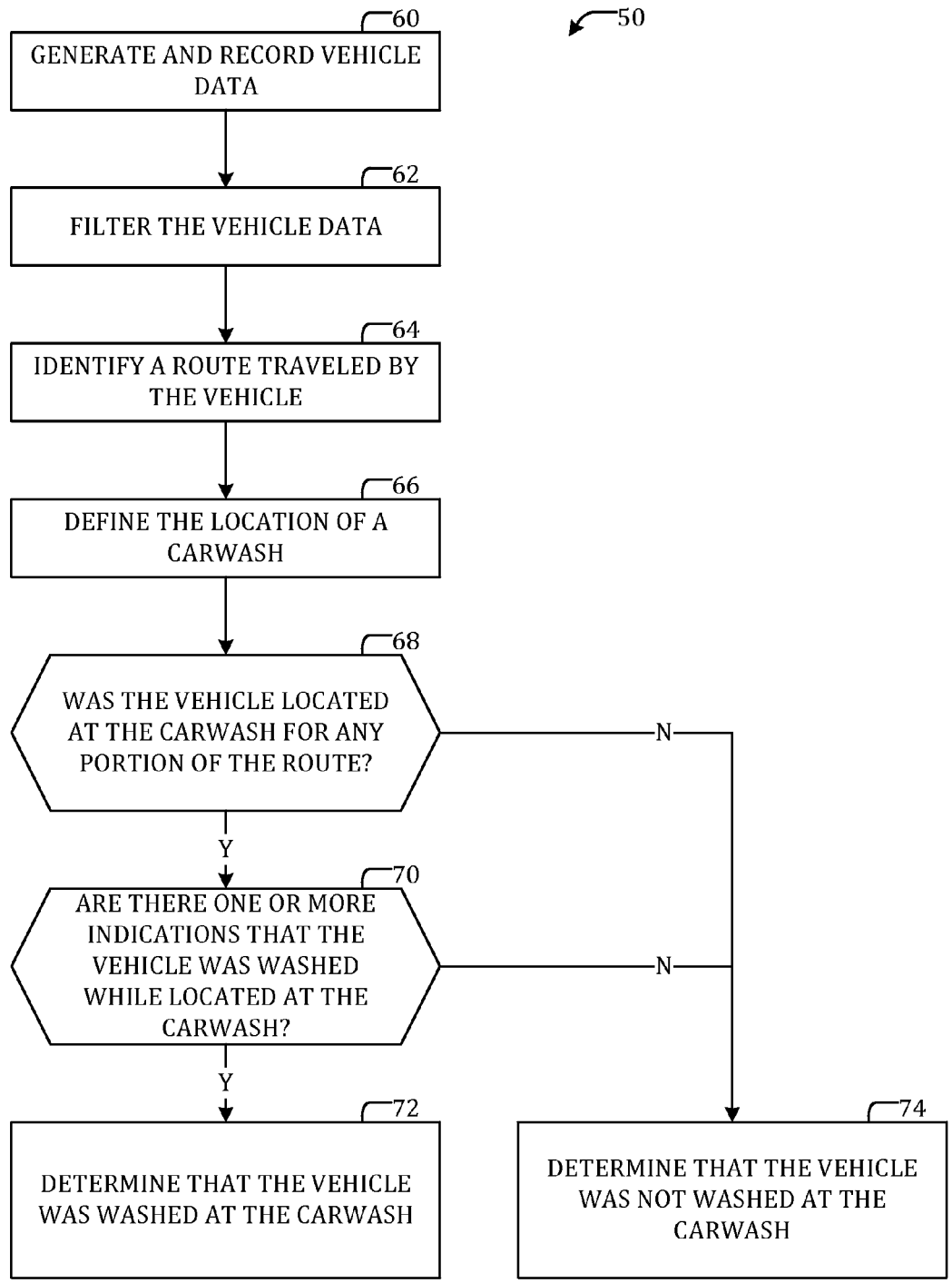
FIG. 3 is a flow diagram depicting operations for evaluating the recorded vehicle data to identify instances where the vehicle has been taken to a carwash and washed.

FIG. 3 depicts the operations of a process 50 for gathering the vehicle data 40 and evaluating the vehicle data 40 to determine whether the vehicle 12 has been taken in by its driver for a carwash.

In operation 60, the vehicle data 40 is generated and recorded at the data center 30. As generally explained above, the vehicle data 40 will include navigation data for the vehicle 12 and may optionally include contemporaneous vehicle condition data for the vehicle 12.

In operation 62, the vehicle data 40 can optionally be filtered. The filters applied to the vehicle data 40 may generally be defined, for example, to identify portions of the vehicle data 40 that do not correspond to one or more of times, whether conditions or other circumstances where a driver of the vehicle 12 is not likely to have taken the vehicle 12 to a carwash to be washed.

Figure 4:
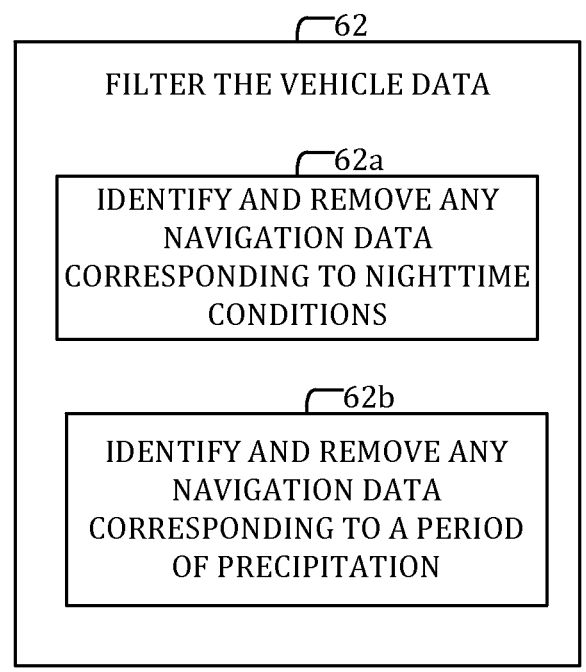

According to operation 62a depicted in FIG. 4, application of filters to the vehicle data 40 may include, for example, identification and removal of portions of the vehicle data 40 that correspond in time to nighttime conditions. According to operation 62b, application of filters to the vehicle data 40 may additionally or alternatively include identification and removal of portions of the vehicle data 40 that correspond to periods of precipitation. Operation 62a and operation 62b may be supported, for instance, by supplying the data center 30 with sunrise and sunset calendars, weather forecasts, weather reports and/or other sources or relevant information, which can be compared against the vehicle data 40 by referencing the time element of the vehicle data 40. The nighttime conditions and/or periods of precipitation can be for an area including the location of the vehicle 12 if the requisite information is available, although information for an area near the location of the vehicle 12 could alternatively be used.

It will be understood that the foregoing filters are provided as non-limiting examples that may be applied to the vehicle data 40 individually or in any combination with one another or with other filters. Further, although the operations for applying filters to the vehicle data 40 are shown and described as initial operations performed upon recording the vehicle data 40, it will be understood that the one, some or all of the foregoing filters could be applied at alternate points in the evaluation of the vehicle data 40 according to the process 50.

In operation 64, one or more routes traveled by the vehicle 12 are identified from the filtered vehicle data 40. A given route traveled by the vehicle 12 may be identified for example from the navigation data included in the vehicle data 40, which as explained above is generally indicative of the position of the vehicle 12 over a period of time, either alone or in combination with the vehicle condition data included in the vehicle data 40. In operation 66, the location of a carwash is defined. The location of a carwash may be identified and defined on the basis of public records and/or private records associated with the carwash, including, for example, one or more of maps, websites or point-of-interest (POI) listings.

Once the location of the carwash is defined, the location of the carwash can be compared against the routes traveled by the vehicle 12. In operation 68, it is identified whether the vehicle 12 was located at the carwash for any portion of a given route traveled by the vehicle 12. In general, it can be identified that the vehicle 12 was located at the carwash if any of the vehicle data 40, and in particular the navigation data included in the vehicle data 40 and reflecting the given route traveled by the vehicle 12, matches the defined location of the carwash.

The limitations, if any, in the accuracy of the definition of the location of the carwash and/or the accuracy of the navigation data from the vehicle data 40 can be accounted for in making a match between the navigation data and the defined location of the carwash. For instance, in one non-limiting example, the equipment used to support the generation of the navigation data included in the vehicle data 40 (e.g., the GPS unit 14, the TCU 20 and the motion sensors 24) may support the generation of navigation data that is accurate to 3-5 meters. In this example, it can be identified that the vehicle 12 was located at the carwash if any of the navigation data included in the vehicle data 40 matches the defined location of the carwash within a radius of 3-5 meters.

If none of the vehicle data 40 for the vehicle 12 can be matched to the defined location of the carwash, it is identified that the vehicle 12 was not located at the carwash and the process 50 follows to operation 74, where it is determined that the vehicle 12 was not washed at the carwash.

However, if any of the vehicle data 40 for the vehicle 12 can be matched to the defined location of the carwash, then the vehicle data 40 can be further evaluated to identify the indications, if any, that the vehicle 12 was washed while it was located at the carwash. FIG. 5 depicts the operations of a non-limiting example of a process 100 for evaluating the vehicle data 40 matched to the location of a carwash in an attempt to identify indications that the vehicle 12 was washed while it was located at the carwash.

The duration of the stay of the vehicle 12 at the carwash could be indicative of whether the vehicle 12 was washed while it was located at the carwash. For example, it may be more likely that the driver of the vehicle 12 had the vehicle 12 washed if the vehicle 12 was located at the carwash for a predetermined period of time. The predetermined period of time could be or include, for instance, the amount of time generally required to perform a wash of the vehicle 12 at the carwash. It will be understood that the predetermined period of time could be defined in theory or based on heuristics in consideration, for example, of the driver of the vehicle 12, the configuration of the vehicle 12 and/or the configuration of the carwash. In accordance with this example, in operation 110, it can be determined whether the vehicle 12 was located at the carwash for the predetermined period of time.

The duration of the stay of the vehicle 12 at the carwash may be determined, for example, based on the navigation data for the vehicle 12. According to this example, the duration of the vehicle 12 can be recognized as the elapsed time between the first and the last of the navigation data included in the vehicle data 40 that matches the defined location of the carwash. The duration of the stay of the vehicle 12 at the carwash could alternatively or additionally be recognized based on the vehicle condition data for the vehicle 12. As explained above, the vehicle condition data may generally be indicative of the operational aspects of the vehicle 12 including, for example, instances of the vehicle 12 being powered on or off. According to this example, the duration of the vehicle 12 can be recognized as the elapsed time between an instance of the vehicle 12 being powered off while the vehicle 12 was located at the carwash and an instance of the vehicle 12 being powered on while the vehicle 12 was located at the carwash.

As shown, if it is determined that the vehicle 12 was located at the carwash for the predetermined period of time, an indication 112 is identified that the vehicle 12 was located at the carwash for the predetermined period of time.

Another indication of whether the vehicle 12 was washed while it was located at the carwash could be whether the vehicle 12 was powered on or off while it was located at the carwash, which as noted above, can be recognized based on the vehicle condition data for the vehicle 12 included in the vehicle data 40. In accordance with this example, in operation 114, it can be determined whether the vehicle 12 was powered on or off while it was located at the carwash.

For certain carwashes (e.g., self-service carwashes), it may be more likely that the driver of the vehicle 12 had the vehicle 12 washed if the vehicle 12 was powered off while it was located at the carwash. For these carwashes, as indicated, if it is determined that the vehicle 12 was powered off while it was located at the carwash, an indication 116 is identified that the vehicle 12 was powered off while it was located at the carwash. For other carwashes (e.g., automatic carwashes), it may be more likely that the driver of the vehicle 12 had the vehicle 12 washed if the vehicle 12 was powered on while it was located at the carwash. For these carwashes, as indicated, if it is determined that the vehicle 12 was powered on while it was located at the carwash, an indication 116 is identified that the vehicle 12 was powered on while it was located at the carwash.

The operations 110 and 114 may be performed individually, as generally shown in FIG. 5. However, in an alternative implementation of the process 100, the operations 110 and 114 could be combined in a single operation to determine whether the vehicle 12 was powered on or off for a predetermined period of time while the vehicle 12 was located at the carwash. The same general considerations set forth above for defining the predetermined period of time, and for characterizing whether the vehicle being powered off or being powered on corresponds to a likelihood that the driver of the vehicle 12 had the vehicle 12 washed while it was located at the carwash, are applicable to this alternative implementation of the process 100.

The example of the process 100 is described with reference to the vehicle data 40 matched to the location of a carwash. However, certain aspects of the process 100 could alternatively be performed at alternate points in the evaluation of the vehicle data 40. For instance, determinations that do not require a predicate determination that the vehicle 12 was located at a carwash, such as whether the vehicle 12 was powered on or whether the vehicle 12 was powered off, could be made prior to matching the vehicle data 40 to the location of a carwash, for example when the vehicle data 40 is filtered according to operation 62.

Upon completion of the evaluating the vehicle data 40 matched to the carwash according to the process 100, the process 50 follows to operation 70. In operation 70, it is determined whether there are one or more indications that the vehicle 12 was washed while it was located at the carwash. The indications required to satisfy operation 70 can generally depend on the particular implementation of the process 100. For the above described implementation of the process 100, for instance, operation 70 could be satisfied upon identification of one of the indication 112 that the vehicle 12 was located at the carwash for the predetermined period of time or the indication 116 that the vehicle was powered off or powered on while it was located at the carwash. Alternatively, the operation 70 could be satisfied only upon identification of both the indication 112 that the vehicle 12 was located at the carwash for the predetermined period of time and the indication 116 that the vehicle was powered off or powered on while it was located at the carwash. It will be understood that the indications required to satisfy operation 70 could vary in other implementations of the process 100 concerning alternative or additional indications that the vehicle 12 was washed while it was located at the carwash.

If the requisite indications for satisfying operation 70 are identified, in operation 72, it is determined that the vehicle 12 was washed while it was located at the carwash. However, if there are not any indications that the vehicle 12 was washed while it was located at the carwash, or the requisite indications for satisfying operation 70 are not identified, the process 50 follows to operation 74, where it is determined that the vehicle 12 was not washed at the carwash.

Although the examples are described with reference to a carwash, it will be understood that the above described systems and processes could be applied in principle to other types of facilities where the vehicle 12 may be taken by its driver for discretionary maintenance.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for determining whether a vehicle was washed at a carwash, comprising:
   recording with a computer navigation data for a vehicle obtained via a GPS unit associated with the vehicle;
   identifying a location of each carwash in the navigation data;
   identifying with the computer that the vehicle was located at a carwash based on the recorded navigation data and the location of each carwash in the navigation data;
   identifying at least one indication that the vehicle was washed while located at the carwash;
   determining that the vehicle was washed at the carwash if the vehicle was located at the carwash and at least one indication is identified that the vehicle was washed while located at the carwash;
   recording a number of times in a term that the vehicle was washed; and
   using the number of times in a reassessment of vehicle resale value.

2. The method of claim 1, further comprising:
   if the vehicle was located at the carwash, determining how long the vehicle was located at the carwash based on the navigation data, wherein identifying at least one indication includes identifying that the vehicle was located at the carwash for at least a predetermined period of time.

3. The method of claim 2, further comprising:
   determining how long the vehicle was located at the carwash based on a time difference between first and last navigation data matched to the location of the carwash.

4. The method of claim 1, further comprising:
   recording vehicle condition data for the vehicle, the vehicle condition data indicating at least whether the vehicle was powered off, wherein identifying at least one indication includes identifying that the vehicle was powered off for at least a predetermined period of time while located at the carwash.

5. The method of claim 1, further comprising:
   recording vehicle condition data for the vehicle, the vehicle condition data indicating at least whether the vehicle was powered on, wherein identifying at least one indication includes identifying that the vehicle was powered on for at least a predetermined period of time while located at the carwash.

6. The method of claim 1, further comprising:
   identifying the at least one indication based on the navigation data.

7. The method of claim 1, further comprising:
   applying a filter to the navigation data, the filter including at least one of:
   identifying at least some of the navigation data as corresponding to nighttime conditions in an area near or including the location of the vehicle, or
   identifying at least some of the navigation data as corresponding to a period where there was precipitation in an area near or including the location of the vehicle.

8. The method of claim 7, further comprising:
   removing the identified at least some of the navigation data from consideration when identifying whether the vehicle was located at the carwash.

9. An apparatus for determining whether a vehicle was washed at a carwash, comprising:
   at least one processor, the at least one processor configured to execute instructions stored in a memory to:
   record navigation data for a vehicle obtained via a GPS unit associated with the vehicle;
   identify a location of each carwash in the navigation data;
   identify whether the vehicle was located at a carwash based on the recorded navigation data and the location of each carwash in the navigation data;
   identify at least one indication that the vehicle was washed while located at the carwash by identifying that the vehicle was located at the carwash for at least a predetermined period of time based on the navigation data;
   determine that the vehicle was washed at the carwash if the vehicle was located at the carwash and at least one indication is identified that the vehicle was washed while located at the carwash; and record a number of times in a term that the vehicle was washed.

10. The apparatus of claim 9, wherein the at least one processor is further configured to execute instructions stored in the memory to:
determine how long the vehicle was located at the carwash based on a time difference between first and last navigation data matched to the location of the carwash.

11. The apparatus of claim 9, wherein the at least one processor is further configured to execute instructions stored in the memory to:
record vehicle condition data for the vehicle, the vehicle condition data indicating at least whether the vehicle was powered off, wherein identifying at least one indication includes identifying that the vehicle was powered off for at least the predetermined period of time while located at the carwash.

12. The apparatus of claim 9, wherein the at least one processor is further configured to execute instructions stored in the memory to:
record vehicle condition data for the vehicle, the vehicle condition data indicating at least whether the vehicle was powered on, wherein identifying at least one indication includes identifying that the vehicle was powered on for at least the predetermined period of time while located at the carwash.

13. The apparatus of claim 9, wherein the at least one processor is further configured to execute instructions stored in the memory to:
apply a filter to the navigation data, the filter including at least one of:
identifying at least some of the navigation data as corresponding to nighttime conditions in an area near or including the location of the vehicle, or
identifying at least some of the navigation data as corresponding to a period where there was precipitation in an area near or including the location of the vehicle.

14. The apparatus of claim 13, wherein the at least one processor is further configured to execute instructions stored in the memory to:
remove the identified at least some of the navigation data from consideration when identifying whether the vehicle was located at the carwash.

15. A method for determining whether a vehicle was washed at a carwash, comprising:
recording with a computer vehicle data, the vehicle data including navigation data obtained via a GPS unit associated with a vehicle and vehicle condition data for the vehicle;
identifying a location of each carwash in the navigation data;
identifying at least some of the vehicle data as corresponding to at least one of nighttime conditions or a period where there was precipitation in an area near or including the location of the vehicle;
removing from consideration the identified at least some of the vehicle data corresponding to nighttime conditions and the period where there was precipitation in the area near or including the location of the vehicle;
identifying with the computer that the vehicle was located at a carwash based on remaining vehicle data and the location of each carwash in the navigation data;
using the vehicle data matched to the location of the carwash, identifying at least one indication that the vehicle was washed while located at the carwash, the at least one indication including that the vehicle was located at the carwash for at least a predetermined period of time; and
upon identifying the at least one indication, determining that the vehicle was washed at the carwash.

16. The method of claim 15, wherein the vehicle data matched to the location of the carwash includes vehicle condition data indicating at least whether the vehicle was powered off, and wherein the at least one indication further includes that the vehicle was powered off for at least the predetermined period of time while located at the carwash.

17. The method of claim 15, wherein the vehicle data matched to the location of the carwash includes vehicle condition data indicating at least whether the vehicle was powered on, and wherein the at least one indication further includes that the vehicle was powered on for at least the predetermined period of time while located at the carwash.

* * * * *